United States Patent [19]
Ohtake

[11] Patent Number: 5,696,632
[45] Date of Patent: Dec. 9, 1997

[54] ZOOM LENS CAPABLE OF FOCUSING AT CLOSE RANGE

[75] Inventor: Motoyuki Ohtake, Saitama, Japan

[73] Assignee: Nikon Corporation, Tokyo, Japan

[21] Appl. No.: 561,232

[22] Filed: Nov. 21, 1995

Related U.S. Application Data

[63] Continuation-in-part of Ser. No. 511,855, Aug. 7, 1995, abandoned.

Foreign Application Priority Data

Sep. 7, 1994 [JP] Japan .................. 6-239365

[51] Int. Cl.⁶ ........................... G02B 15/14
[52] U.S. Cl. ........................... 359/684; 359/683
[58] Field of Search ................ 359/692, 689, 359/686, 684, 683

[56] References Cited

U.S. PATENT DOCUMENTS

| | | | |
|---|---|---|---|
| 4,844,600 | 7/1989 | Tokumaru | 359/684 |
| 5,042,926 | 8/1991 | Kikuchi | 359/684 |
| 5,164,859 | 11/1992 | Ito | 359/692 |
| 5,172,273 | 12/1992 | Yamanashi | 359/684 |
| 5,329,401 | 7/1994 | Sato | 359/684 |

*Primary Examiner*—Scott J. Sugarman
*Attorney, Agent, or Firm*—Oliff & Berridge

[57] ABSTRACT

A zoom lens is capable of focusing at a close range and the focusing lens group can be controlled with a small memory capacity. The zoom lens includes, in order from the object side to the image side of the zoom lens, a first variable power unit GH, which has at least two variable power zoom lens groups movable along the optical axis for zooming, and a focusing lens group GF movable along the optical axis when focusing on close range objects. The magnification BF of the focusing lens group GF is selected such that $1/|\beta F|<0.35$ is satisfied over the entire zooming range of the zoom lens from wide-angle end to telephoto end.

25 Claims, 20 Drawing Sheets

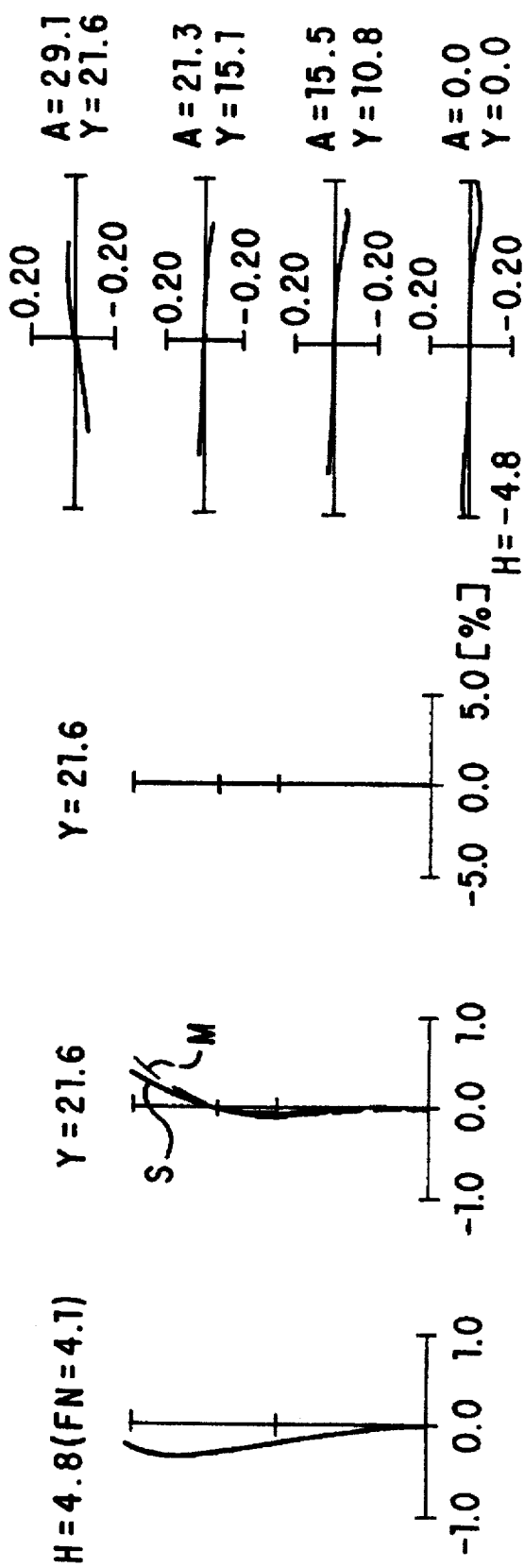

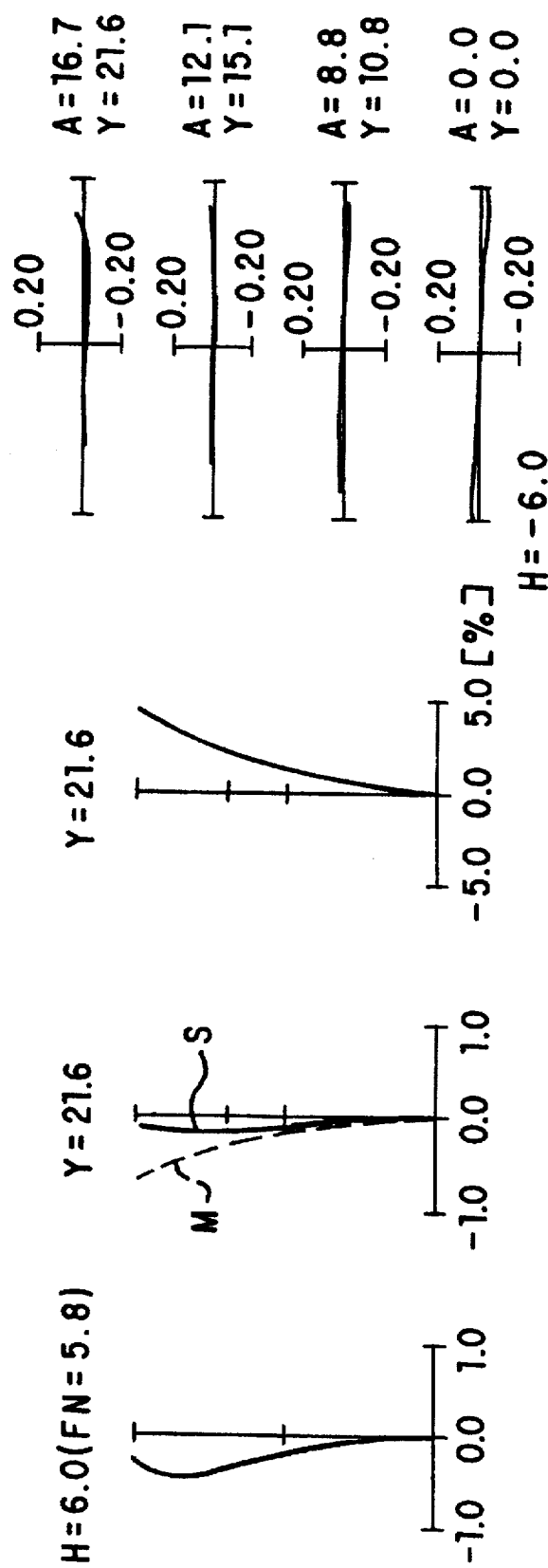

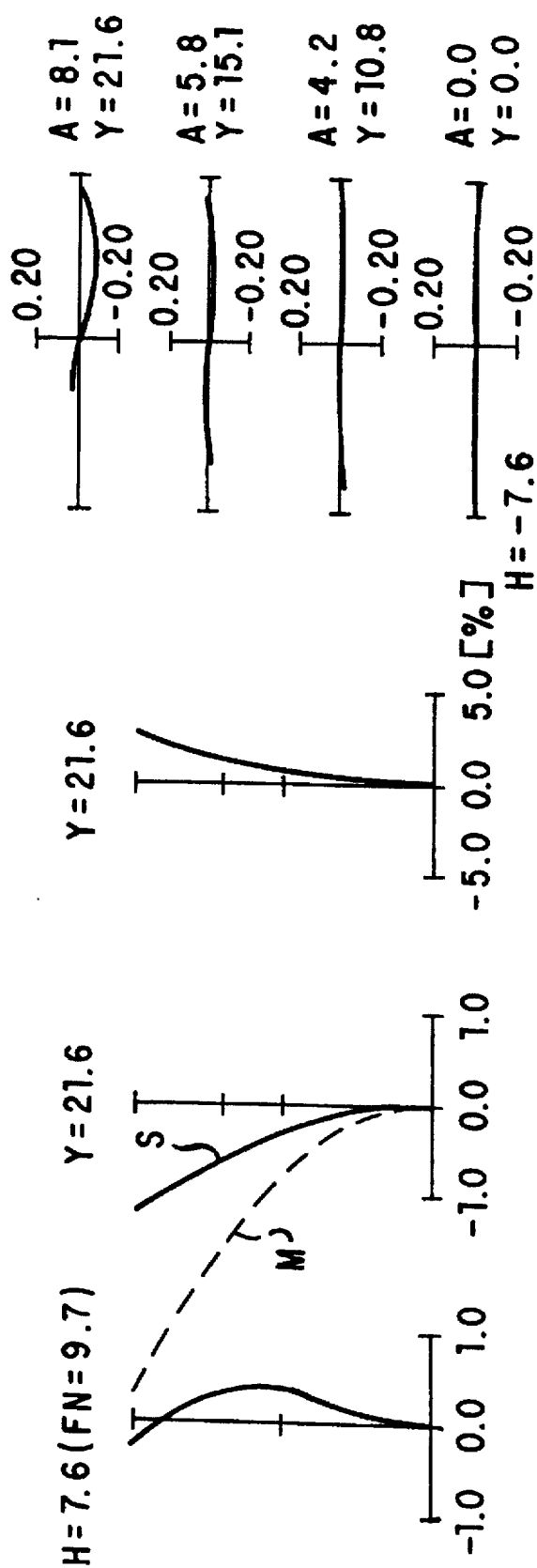

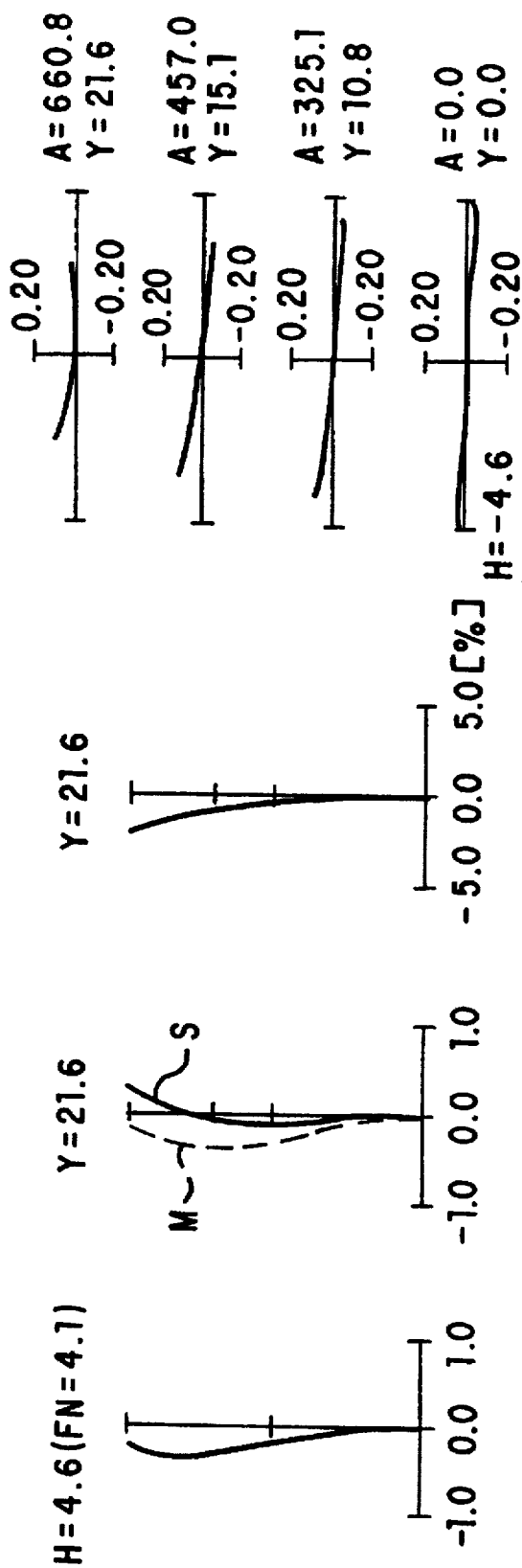

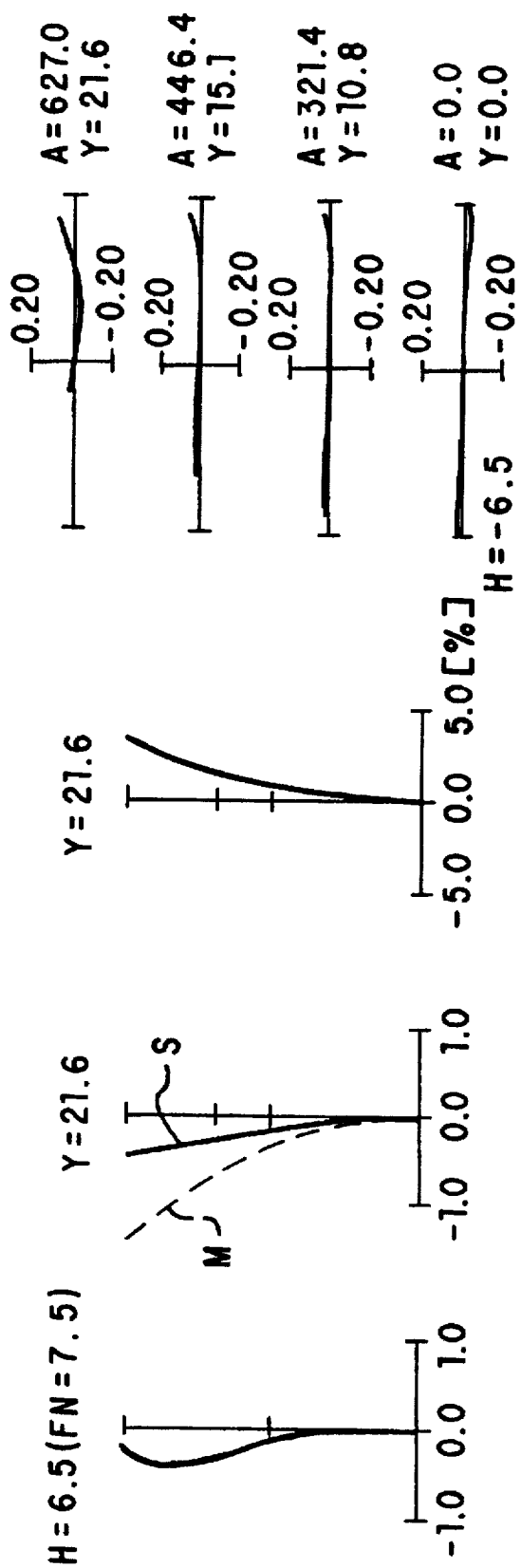

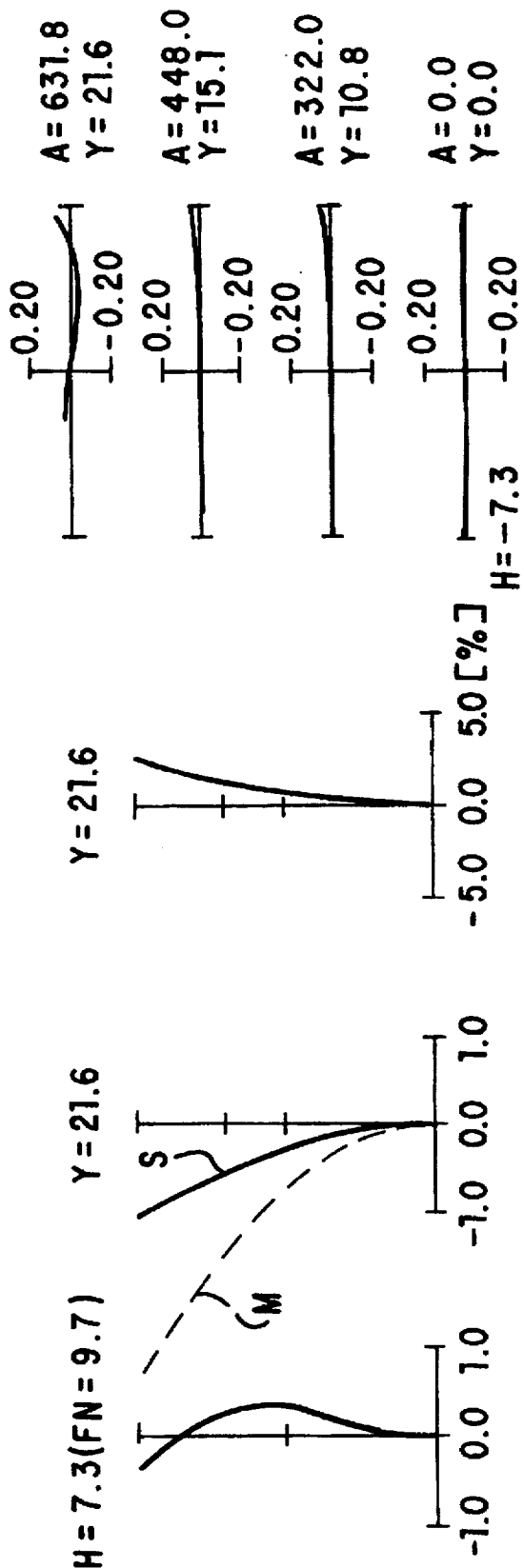

ZOOM LENS CAPABLE OF FOCUSING AT CLOSE RANGE

This application is a Continuation-In-Part of application Ser. No. 08/511,855, filed on Aug. 7, 1995, now abandoned.

BACKGROUND OF THE INVENTION

1. Field of the Invention

This invention relates to a zoom lens capable of focusing at close range. In particular, the zoom lens relates to an inner focus type zoom lens.

2. Description of Related Art

In recent years, various types of zoom lenses have been proposed to meet the desired higher performance and more sophisticated specifications required for zoom lenses. In addition, with recent advances in lens barrel technology, various types of zoom lenses have been proposed having a high zoom ratio. The proposed lenses utilize so-called multiple group zoom lenses, which have at least three movable lens groups.

With these known multiple group zoom lenses, the zoom range is increased while simultaneously suppressing variation of the aberrations. The aberrations are produced when zooming because the number of degrees of freedom an increased when selecting of the zooming locus of each lens group of the lens system.

In addition, various focusing methods have also been proposed. Generally, a focusing lens group moves along the optical axis for focusing on objects at a close range. The focusing lens group should have a small displacement because the smaller the focusing displacement, the smaller the lens system. Further, the weight of the focusing lens group should be light, because when the lens weight is lighter, the mechanism that drives the lenses can be simpler.

Previously, the three methods have been proposed for focusing on an object at a close range with a zoom lens. These methods are:

A) Front focus (FF) method;
B) Inner focus (IF) method; and
C) Rear focus (RF) method In the front focus method, the first lens group is positioned furthest from the imaging plane, i.e., closest to the object. Consequently, the lens diameter of the first lens group must be large and bulky. Thus, the front lens group is not suitable for a focusing lens group in a compact lens system.

In the inner focus method and the rear focus method, it is possible to select a lens group having a small lens diameter as the focusing lens group. Accordingly, it is possible to reduce the size and weight of the focusing lens group.

However, in conventional multiple group zoom lenses, when close range focusing is conducted using the IF method or the RF method, the displacement a of the focusing lens group, with respect to a preset object distance R, i.e., the distance between the object and the image plane, can be expressed using an approximating equation, such as equation (1):

$$\Delta = a_1 \cdot R^{-1} + a_2 \cdot R^{-2} + a_3 \cdot R^{-3} \qquad (1)$$

The coefficients $a_n$ in equation (1) change for zooming, as the focal length of the zoom lens is varied from a wide-angle end to a telephoto end. Consequently, controlling the focusing lens group is difficult. In addition, it is necessary to store, in a memory, the coefficients $a_n$ for various length state conditions. Consequently, the required memory capacity is large, which is inconvenient.

SUMMARY OF THE INVENTION

In view of the above problems, this invention provides a zoom lens capable of focusing at a close range, where control of the focusing lens group can be achieved with a small capacity memory.

The zoom lens comprises, in order from an object side to an image side of the zoom lens a first variable power lens unit GH, which has at least two lens groups and at least one of the lens groups movable along the optical axis for zooming, and a focusing lens group GF movable along the optical axis to focus on close range objects. The zoom lens is configured so that βF, which represents the lateral magnification of the focusing lens group GF when focused on an infinite object, meets the condition set forth in equation (2):

$$1/|\beta F|<0.35 \qquad (2)$$

Furthermore, equation (2) must be satisfied over the entire zoom range, from wide angle to telephoto end.

With one configuration of the invention, the first variable power lens unit GH has at least one lens group that has positive refractive power. The first variable power unit GH also has at least one lens group that has a negative refractive power. The positive refractive power lens group and the negative refractive power lens group are movable along the optical axis for zooming. The zoom lens is configured so that fh, which represents the focal length of the first variable power lens unit GH, and f, which represents the focal length of the entire lens system, meet the condition of equation (3):

$$|fh|/f<1.2 \qquad (3)$$

Furthermore, equation (3) must be satisfied over the entire zooming range, from wide-angle end to telephoto end.

BRIEF DESCRIPTION OF THE DRAWINGS

Hereinafter, the preferred embodiments of this invention are described with reference to the attached drawings, in which:

FIGS. 3A and 3B show the zoom construction at the wide-angle and telephoto end, respectively.

FIGS. 12A–12D represent aberrations when the second preferred embodiment of the zoom lens is at an infinite focal length as in the wide-angle end;

FIGS. 13A–13D represent the aberrations when the second preferred embodiment of the zoom lens is in the infinite focal length at a first intermediate magnification state;

FIGS. 15A–15D represent the aberrations when the second preferred embodiment of the zoom lens is in the infinite focal length at the telephoto end;

FIGS. 16A–16D represent the aberrations when the second preferred embodiment of the zoom lens has a photography magnification of −1/30 when in the wide-angle and;

FIGS. 18A–18D represent the aberrations when the second preferred embodiment of the zoom lens has a photography magnification of −1/30 when in a second intermediate focal magnification state;

FIGS. 19A–19D represent the aberrations when the second preferred embodiment of the zoom lens has a photography magnification of −1/30 when in the telephoto end.

DETAILED DESCRIPTION OF THE PREFERRED EMBODIMENTS

Figure 1A:
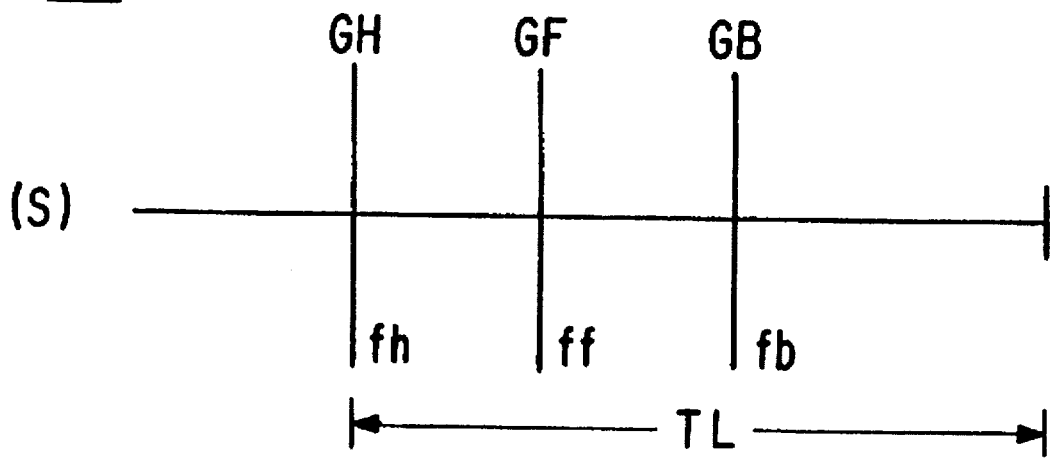
FIGS. 1A and 1B show an object at a close range is focused upon using a thin lens system.
Figure 1B:
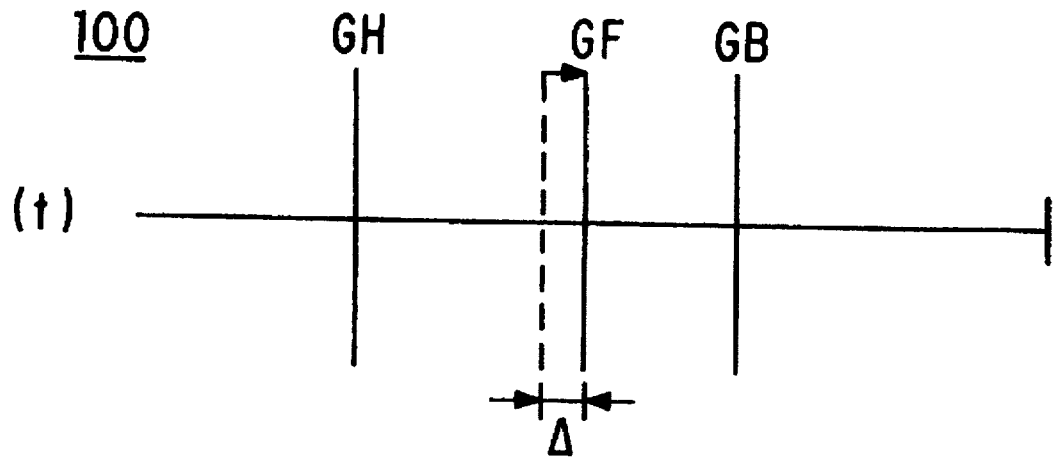

FIGS. 1A and 1B show a zoom lens 100 having a thin lens system. In this thin lens system, the displacement $\Delta$ of the focusing lens group GF is suppressed when focusing at a close range. Control of the focusing lens group GF can be easily performed. The zoom lens 100 is focussed using the inner focus (IF) method.

The zoom lens 100 includes, in order from the object side to the image side, a first variable power lens GH, which is movable along the optical axis when zooming is conducted; a focusing lens group GF, which is movable along the optical axis for focusing at close range; and a lens group GB, which is positioned on the image side of the focusing lens group GF. FIG. 1A shows the relative positions of the lens groups GH, GF and GB of the zoom lens 100 when the focal length is infinite, i.e., when the object is positioned at infinity. FIG. 1B shows the relative positions of the lens groups GH, GF and GB of the zoom lens 100 when the focal length is finite, i.e., when the object is positioned at close range.

As the position of the object moves from an infinite distance to close range, close range focusing is performed by the focusing lens group GF. The focusing lens group GF is movable by a displacement amount $\Delta$ along the optical axis. The position of the first variable power lens group GH and the position of the object point, with respect to the lens group GB through the focusing lens group GF, are fixed.

The focal length $f$ of the zoom lens 100 can be expressed by equation (4):

$$f = fh \cdot \beta F \cdot \beta B \quad (4)$$

where $fh$ is the focal length of the first variable power lens unit GH; $\beta F$ is the magnification of the focusing lens group GF; and $\beta B$ is the magnification of the lens group GB.

In addition, the relationship between the object distance R and the displacement $\Delta$ of the focusing lens group GF can be expressed by equation (5):

$$(R-TL) \cdot G = fh^2 \quad (5)$$

where TL is the distance between the primary position of the first variable power lens unit GH and the imaging plane along the optical axis G can be expressed by equation (6):

$$G = \Delta\{\Delta + (\beta F^2 - 1)(fF/\beta F)\}/(\Delta + \beta F \cdot fF) \quad (6)$$

When $\beta F^2$ is large compared to 1, i.e., when $\beta F^2 \gg 1$, it is possible to make the approximation $G = \Delta$ in equation (6). As a result, it is possible to approximate equation (5) by equation (7):

$$(R-TL) \cdot \Delta = fh^2 \quad (7)$$

Further, when the object distance R is large compared with TL, i.e., when $R \gg TL$, it is possible to approximate equation (7) by equation (8):

$$R \cdot \Delta = fh^2 \quad (8)$$

In addition, equation (8) can also be expressed as shown in equation (9):

$$\Delta = fh^2 \cdot R^{-1} = (fh^2)/R \quad (9)$$

Figure 2:
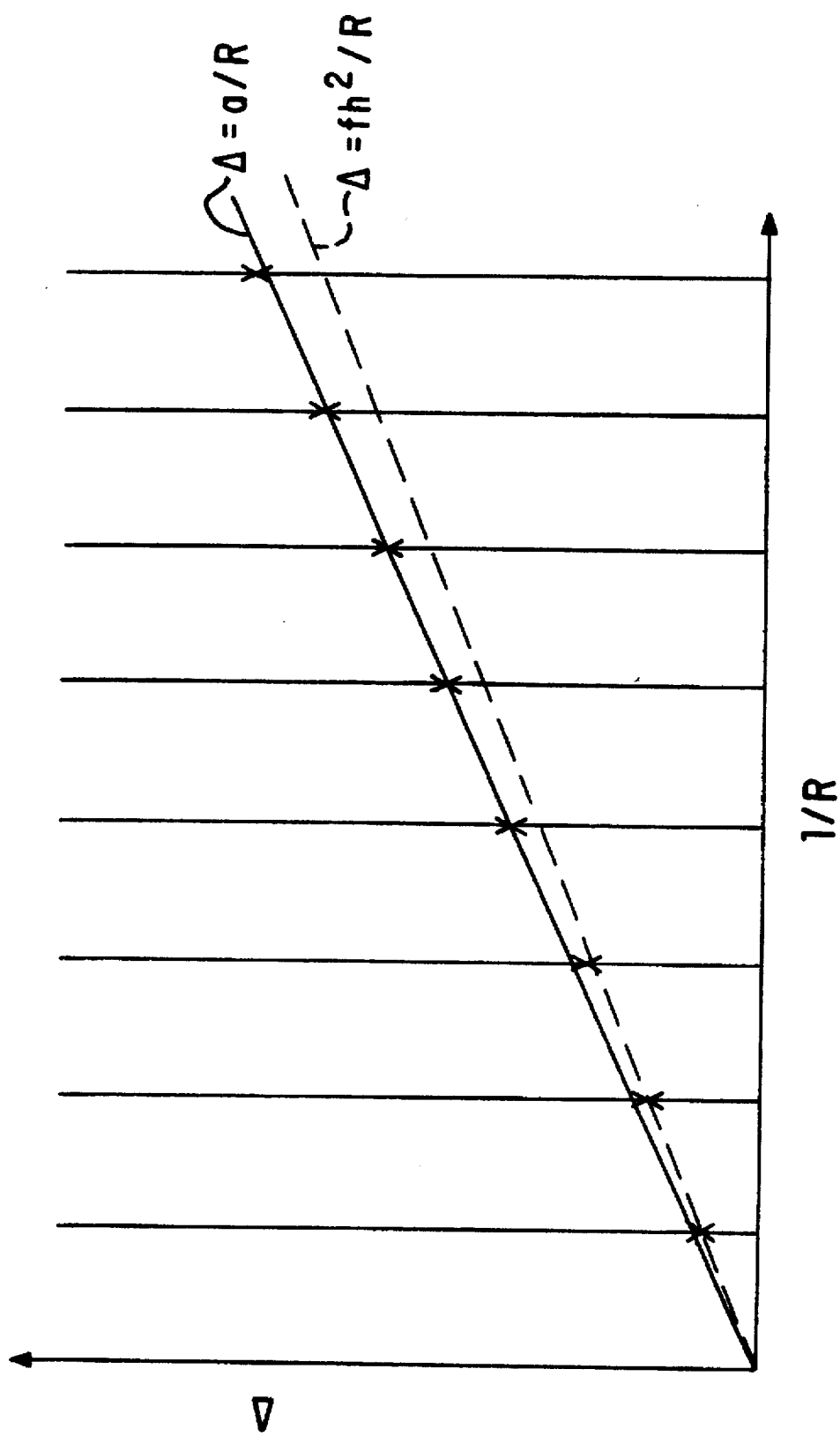
FIG. 2 shows the relationship between the displacement Δ of the focusing lens group GF, and the reciprocal 1/R of the object distance R.

FIG. 2 graphically shows the relationship between the displacement $\Delta$ of the focusing lens group GF, and the reciprocal 1/R of the object distance R. In FIG. 2, the dashed line indicates an approximation of equation (9).

When $\beta F^2 \gg 1$, i.e., when $\beta F^2$ is large compared with 1, as shown in FIG. 2, the displacement $\Delta$ of the focusing lens group GF departs from the line representing approximating equation (9), as the reciprocal 1/R of the object distance becomes larger. However, when $\beta F^2$ becomes large enough, it is possible to approximate the relationship between the displacement $\Delta$ of the focusing lens group GF and 1/R by using equation (10):

$$\Delta' = a \cdot R^{-1} = a/R \quad (10)$$

Equation (H) uses a proportionality constant "a" which differs slightly from the proportionality constant $fh^2$ in approximating equation (9). In particular, the proportionality coefficient or constant "a" is computed by the least squares method.

By using the approximating equation (10), it is possible to reduce the error ($\Delta' - \Delta$) to an extremely small amount, where $\Delta'$ is the approximate displacement of the focusing lens group GF and is computed from equation (10), and $\Delta$ is the required displacement of the focusing lens group. In other words, equation (10) is a linear equation using the reciprocal 1/R of the object distance R. Using the approximating equation (10), it is possible to control of the focusing lens group GF with relative ease.

Accordingly, in this invention, the magnification $\beta F$ of the focusing lens group GF is always large enough compared to 1 when zooming is conducted. Control of the focusing lens group GF is performed using a simple approximating equation, such as equation (10). Coefficients $a_2$ to $a_n$ in equation (1) are set to 0. Therefore, it is possible to control the focusing lens group GF with relative ease using a small memory capacity.

An example of a zoom lens where the magnification βF of the focusing lens group is much greater than 1, i.e. $\beta F^2 \gg 1$, is a positive-negative-positive three-group zoom lens, where focusing is performed by the second lens group, which has negative refractive power. However, with positive-negative-positive three-group zoom lenses, there are only a few lens groups that are responsible for zooming operation. Therefore, when attempting to increase the available zooming range, the change in the aberrations produced upon varying zooming becomes large. It is difficult, therefore, to increase the zoom ratio. Additionally, the composite refractive power of the first lens group and the second lens group varies a great deal. As a result, the magnification of the second lens group changes a great deal, so the approximation set forth in equation (10) does not work.

In the present invention, the zooming range is increased by positioning at least two movable variable power lens groups on the object side of the focusing lens group GF. In addition, conditions established for the magnification βF of the focusing lens group are suitable, so the approximation set forth in equation (10) is satisfied for all of the zoom range.

The zoom lens 100 of this invention, which is capable of focusing at close range, satisfies the equation (2), as set forth above:

$$1/|\beta F| < 0.35 \tag{2}$$

where, βF is the magnification the focusing lens group when focussed on an infinite object.

Equation (2) determines a suitable range for the magnification βF of the focusing lens group GF. When the upper limit in equation (2) is exceeded, the size of the magnification βF of the focusing lens group GF becomes too small. Thus, the approximation set forth in equation (10) is not met. In other words, the higher order terms $R^{-2} - R^{-n}$ become necessary in equation (1).

In the present invention, the first variable power lens unit GH has at least a negative power lens group and a positive power lens group. At least one of the negative power and positive power lens groups are capable of moving when zooming. To simplify the focusing drive mechanism, the first variable power lens unit GH should satisfy as set forth above:

$$|fh|/f < 1.2 \tag{3}$$

while also suppressing the displacement Δ of the focusing lens group GF, thus conserving space by making the lens system smaller, where fh is the focal length of the first variable power lens unit GH, and f is the focal length of the zoom lens 100.

Equation (3) determines the suitable range for the ratio of the focal length of the first variable power lens unit GH to the focal length of the zoom lens 100.

As noted above, equation (9) expresses the relationship between the object distance R and the displacement Δ of the focusing lens group GF. However, the displacement Δ of the focusing lens group GF is proportional to the second power of the focal length fh of the first variable power lens unit GH. Consequently, as the size of the focal length fh becomes larger, the displacement Δ of the focusing lens group GF becomes larger with respect to the object distance R.

Thus, it is not preferable for the upper limit in equation (3) to be exceeded, because the magnitude of the absolute value of fh (|fh|), the focal length of the first variable power lens unit GH, becomes larger. This causes the displacement Δ of the focusing lens group GF to become too large to be practical.

In order to increase zooming range while shortening the overall lens length, the first variable power lens unit GH has, in order from the object side to the image side, a positive power lens group G1 and a negative power lens group G2. At least the positive lens group G1 should be movable toward the object, so that the distance between the positive power lens group G2 and the negative power lens group G2 increases for zooming from wide angle to telephoto.

Additionally, by arranging a stop S in the space adjacent to the focusing lens group GF, the height of light rays that pass through the focusing lens group GF can be brought closer to the optical axis. Therefore, the lens diameter of the focusing lens group GF can be made smaller, while the focusing drive mechanism can be relatively simply formed.

Figure 3A:
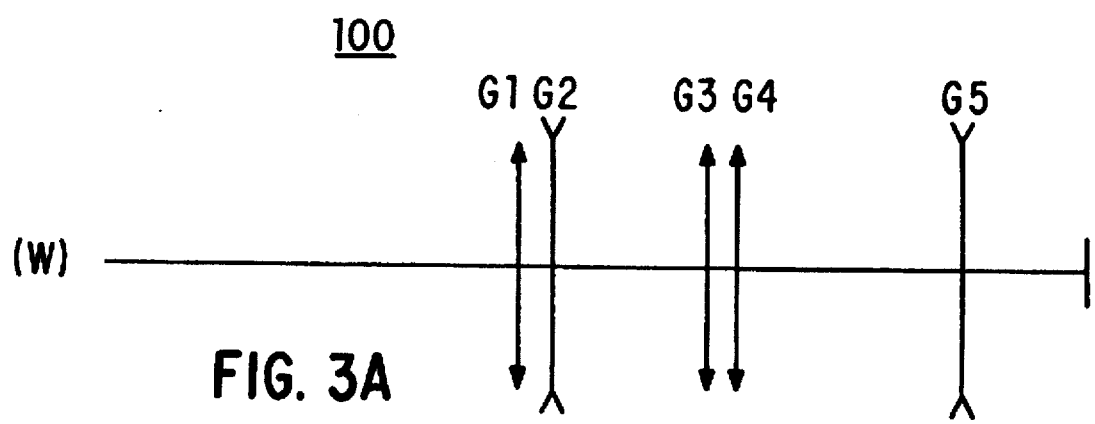
FIGS. 3A and 3B show the zoom construction of the lens system according to one embodiment of the present invention.
Figure 3B:
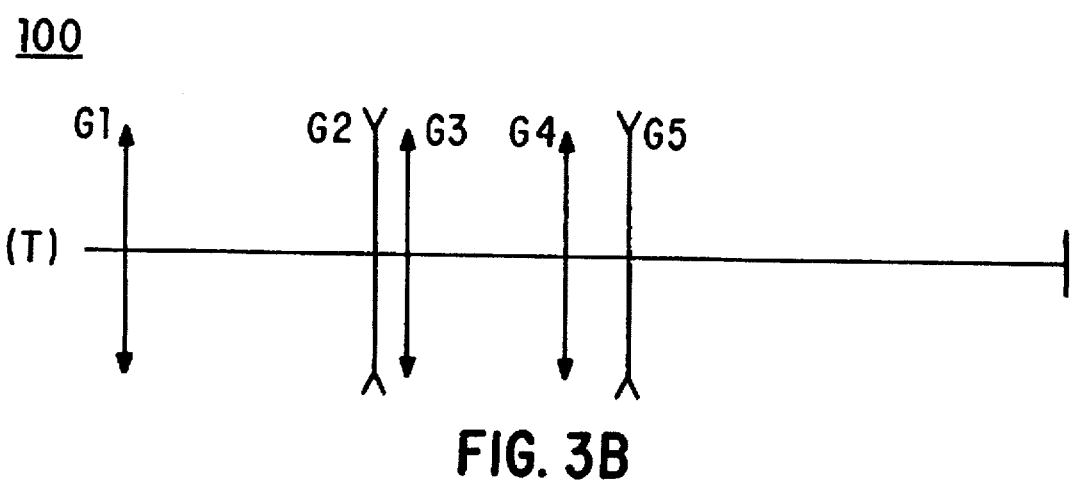

FIGS. 3A and 3B show the relation positions of the lens groups of the zoom lens 100. The zoom lens 100 of FIGS. 3A and 3B includes, in order from the object side to the image side of the zoom lens 100, a first lens group G1 having positive refractive power, a second lens group G2 having negative refractive power, a third lens group G3 having positive refractive power, a fourth lens group G4 having positive refractive power, and a fifth lens group G5 having negative refractive power.

When zooming from wide-angle end to telephoto end, each lens group moves toward the object. In particular, the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases. Furthermore, for zooming from wide-angle end to telephoto end, the second lens group G2 and the fourth lens group G4 move as one unit along the optical axis.

Figure 4:
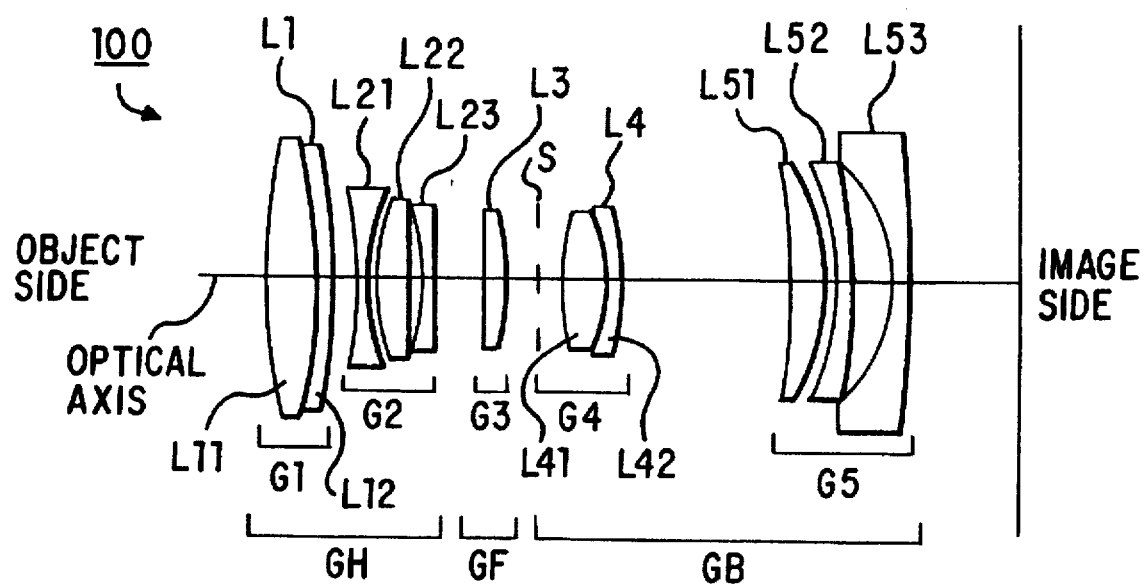
FIG. 4 shows a first preferred embodiment of a zoom lens of the present invention.
Figure 5:
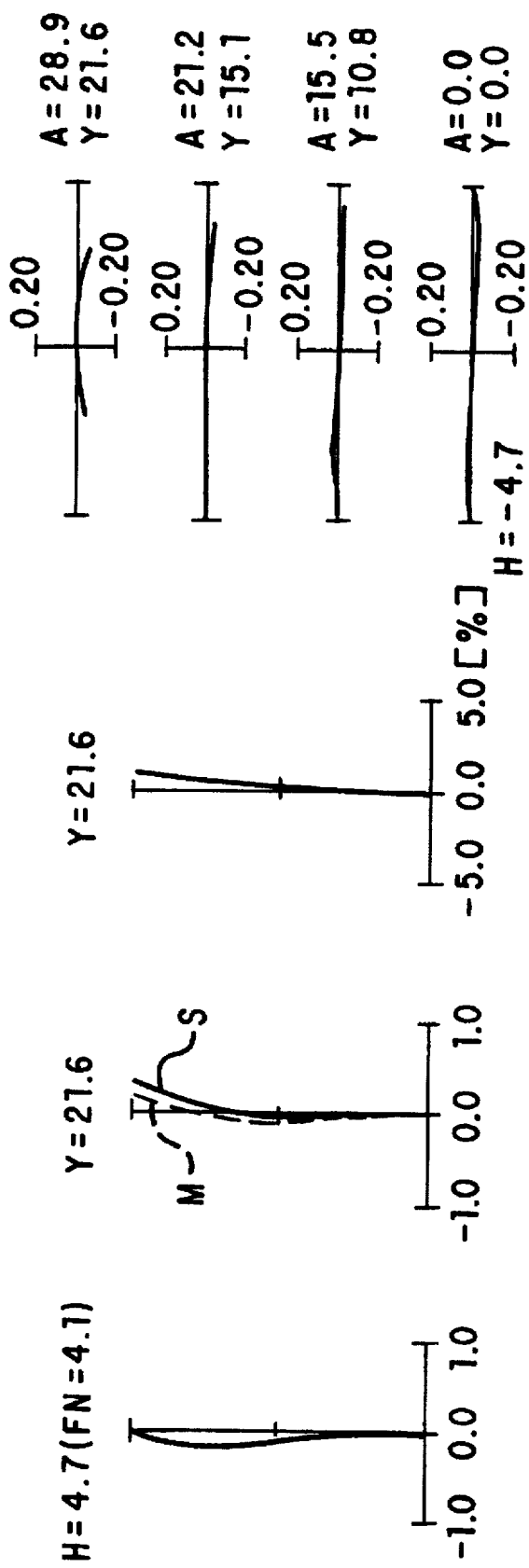
FIGS. 5A–5D represent aberrations at an infinite focal length when the first preferred embodiment of the zoom lens is in the wide-angle end.
Figure 6:
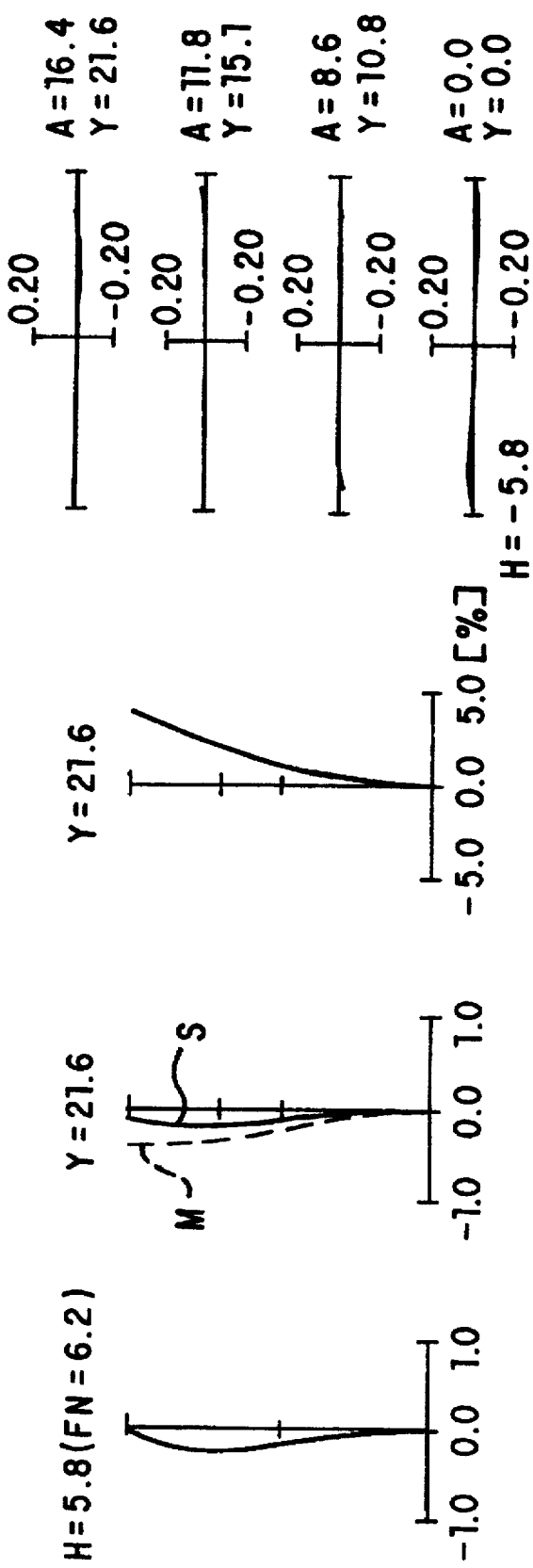
FIGS. 6A–6D represent aberrations at an infinite focal length when the first preferred embodiment of the zoom lens is in an intermediate magnification state.
Figure 7:
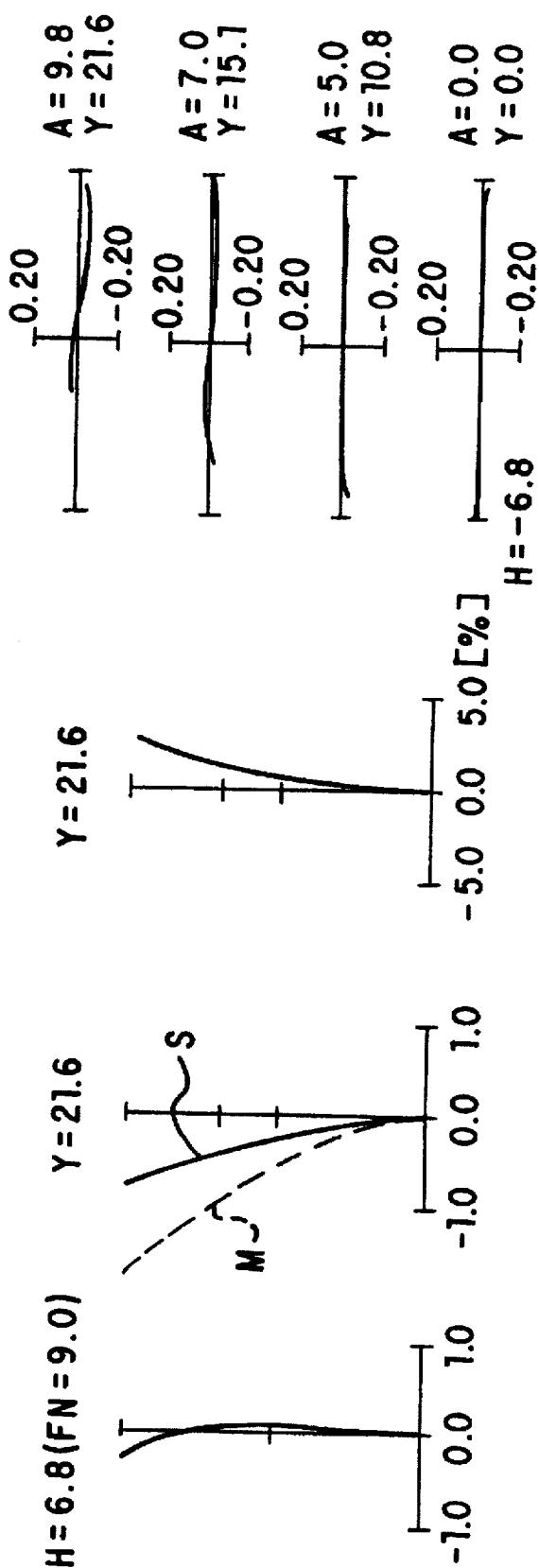
FIGS. 7A–7D represent aberrations at an infinite focal length when the first preferred embodiment of the zoom lens is in the telephoto end.
Figure 8:
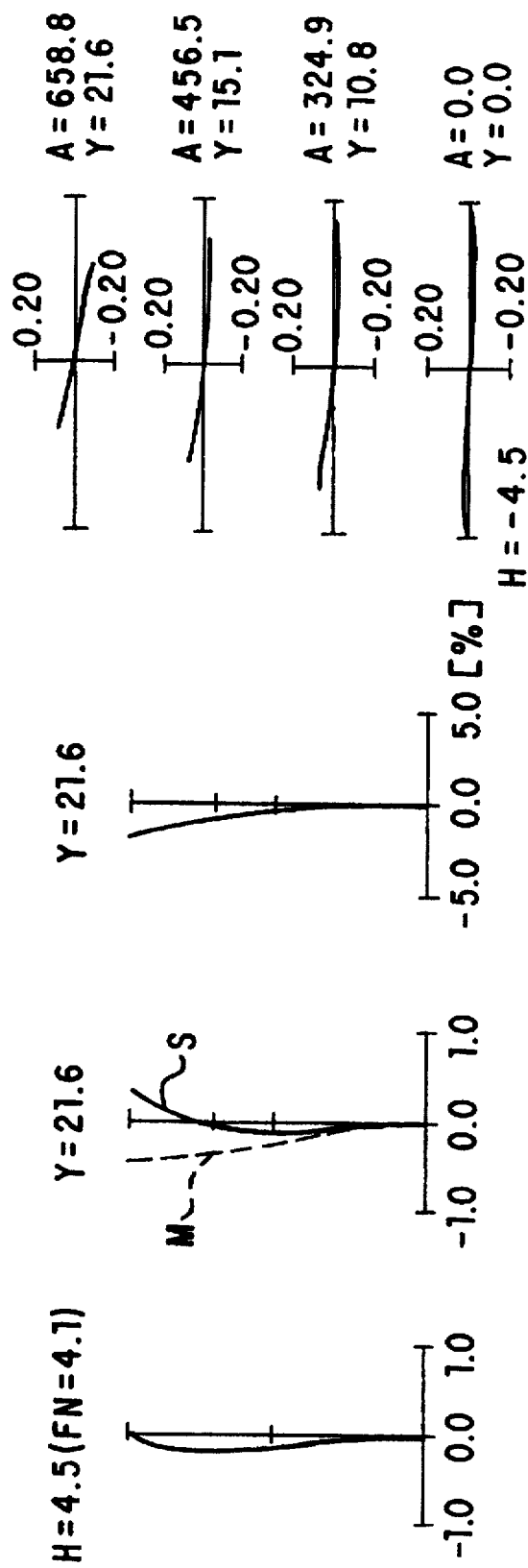
FIGS. 8A–8D represent aberrations when the first preferred embodiment of the zoom lens has a photography magnification of $-\frac{1}{30}$ when in the wide-angle end.
Figure 9:
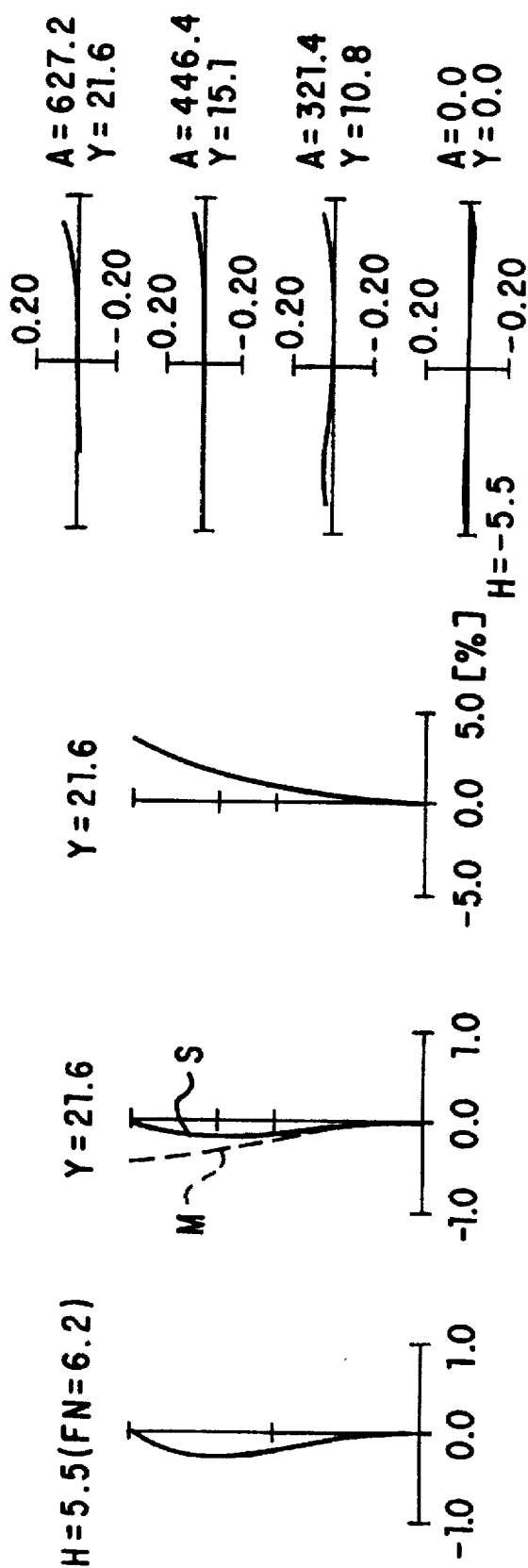
FIGS. 9A–9D represent aberrations when the first preferred embodiment of the zoom lens has a photography magnification of $-\frac{1}{30}$ when in an intermediate focal length state.
Figure 10:
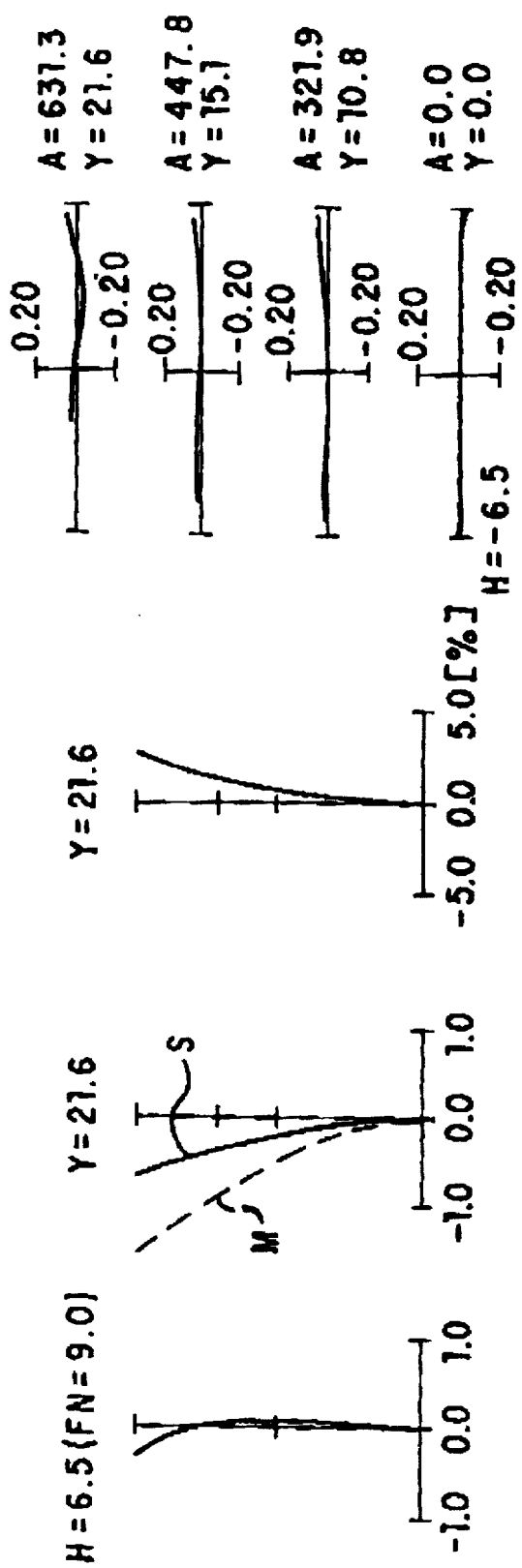
FIGS. 10A–10D are drawings representing the aberrations when the first preferred embodiment of the zoom lens has a photography magnification of −1/30 at the telephoto end.

FIG. 4 shows a first embodiment of the zoom lens 100. In this first preferred embodiment, the zoom lens 100 comprises in order from the object side, to the image side the first lens group G1, the second lens group G2, the third lens group G3, the fourth lens group G4 and the fifth lens group G5.

The first lens group G1 includes a cemented positive lens L1 having a biconvex lens L11 and a negative meniscus lens L12 having its concave surface facing to the object side. The second lens group G2 includes a biconcave lens L21, a biconvex lens L22 and a negative meniscus lens L23 having its concave surface facing to the object side. The third lens group G3 includes a biconvex lens L3. The fourth lens group G4 includes a cemented positive lens L4 having a biconvex lens L41 and a negative meniscus lens L42 having its concave surface facing to the object side. The fifth lens group G5 includes a positive meniscus lens L51 having its concave surface facing to the object side, a negative meniscus lens L52 having its concave surface facing the object side, and a negative meniscus lens L53 having its concave surface facing to the object side. The third lens group G3 moves toward the image side when focusing on an object at a close range.

In this first preferred embodiment, the first lens group G1 and second lens group G2 form the first variable power lens group GH. The third lens group G3 forms the focusing lens group GF. The fourth lens group G4 and fifth lens group G5 form lens group GB, which in this first preferred embodiment is a second variable power lens unit. In addition, the stop S is positioned between the third lens group G3 and the fourth lens group G4. The stop S moves integrally with the fourth lens group G4 for zooming from wide-angle end to telephoto end.

FIG. 4 shows the relative positions between the lens groups when the zoom lens is at a wide-angle setting or state. The lens groups G1–G5 move along the optical axis on a zoom trace indicated by the arrows in FIG. 3, for zooming from wide-angle end to telephoto end.

The values for the first preferred embodiment of the zoom lens 100 are given in Table (1) below. In Table (1), f is the focal length, FNo is the F number, 2ω is the field angle and Bf is the back focus. The surface number indicates the order of the lens surfaces from the object side to the image side along the direction in which light rays move. The refractive indices and Abbe numbers indicate the values for d-lines (λ=587.6 nm).

f=38.80~70.77~121.99 mm

FNo=4.1~6.2~9.0

2ω=57.82~32.75~19.54°

TABLE 1

(a)

| Surface Number | Radius of Curvature | Intersurface Distance | Refractive Index | Abbe's Number |
|---|---|---|---|---|
| 1 | 61.387 | 4.27 | 1.51860 | 69.98 |
| 2 | −40.1459 | 1.26 | 1.867074 | 23.01 |
| 3 | −65.682 | variable | | |
| 4 | −36.446 | 1.13 | 1.77279 | 49.45 |
| 5 | 23.035 | 0.88 | | |
| 6 | 18.0899 | 2.89 | 1.72825 | 28.34 |
| 7 | −81.9223 | 0.75 | | |
| 8 | −20.3912 | 1.13 | 1.77279 | 49.45 |
| 9 | −843.303 | variable | | |
| 10 | 166.8174 | 2.13 | 1.51680 | 64.10 |
| 11 | −20.9749 | variable | | |
| 12 | ∞ | 2.26 | | stop S |
| 13 | 27.6028 | 3.77 | 1.56384 | 60.69 |
| 14 | −11.9399 | 1.13 | 1.80458 | 25.50 |
| 15 | −28.6707 | variable | | |
| 16 | −56.5292 | 3.39 | 1.80458 | 25.50 |
| 17 | −17.7056 | 0.63 | | |
| 18 | −22.6944 | 1.26 | 1.79668 | 45.37 |
| 19 | −63.674 | 3.77 | | |
| 20 | −13.283 | 1.38 | 1.77279 | 49.45 |
| 21 | −117.2884 | (Bf) | | |

(b)
Distance vs. focal length for variable spacing

| f | 38.7954 | 70.7749 | 122.0381 |
|---|---|---|---|
| d3 | 2.1349 | 12.1490 | 18.9058 |
| d9 | 4.2006 | 3.2076 | 1.8837 |
| d11 | 2.7063 | 3.6993 | 5.0232 |
| d15 | 14.7396 | 7.3793 | 2.7127 |
| Bf | 9.4931 | 28.3747 | 54.8313 |

(c)
Δ at photography magnification of −1/50

| Focal length f | 38.7954 | 70.7749 | 122.038 |
|---|---|---|---|
| Object distance R | 1174.0902 | 2114.8527 | 3635.7554 |
| Displacement Δ | 1.2380 | 1.1047 | 0.9683 |

(d)
Distance vs. TL for variable spacing

| f | d3 | d9 | d11 | d15 | Bf | TL |
|---|---|---|---|---|---|---|
| 38.795 | 2.1349 | 4.2006 | 2.7064 | 14.739 | 9.4931 | 65.2978 |
| 48.668 | 6.3366 | 3.8697 | 3.0373 | 11.652 | 15.5785 | 72.4974 |
| 59.352 | 9.6078 | 3.5387 | 3.3683 | 9.2666 | 21.8669 | 79.6714 |
| 70.774 | 12.1490 | 3.2077 | 3.6993 | 7.3793 | 28.3747 | 86.8333 |
| 82.772 | 14.2714 | 2.8767 | 4.0303 | 5.8978 | 34.9130 | 93.9825 |
| 95.330 | 16.0553 | 2.5457 | 4.3613 | 4.6280 | 41.5042 | 101.1248 |
| 108.431 | 17.5812 | 2.2147 | 4.6923 | 3.5912 | 48.1530 | 108.2556 |
| 122.038 | 18.9058 | 1.8837 | 5.0233 | 2.7127 | 54.8313 | 115.3800 |

(e)
Δ vs "a"

| f | 1/R = 0.25 | 1/R = 0.50 | 1/R = 0.75 | 1/R = 1.00 | 1/R = 1.25 | a |
|---|---|---|---|---|---|---|
| 38.7954 | 0.3595 | 0.7222 | 1.0881 | 1.4573 | 1.8298 | 1.45792 |
| 48.668 | 0.4340 | 0.8709 | 1.3107 | 1.7534 | 2.199 | 1.75394 |
| 59.3524 | 0.5096 | 1.0217 | 1.5364 | 2.0535 | 2.573 | 2.05393 |
| 70.774 | 0.5831 | 1.1684 | 1.7558 | 2.3454 | 2.9372 | 2.34582 |
| 82.772 | 0.6576 | 1.317 | 1.9783 | 2.6415 | 3.3067 | 2.64189 |
| 95.330 | 0.7319 | 1.465 | 2.2008 | 2.9378 | 3.676 | 2.93813 |
| 108.4319 | 0.8060 | 1.6138 | 2.4232 | 3.2343 | 3.2343 | 3.23458 |
| 122.038 | 0.8800 | 1.7618 | 2.6455 | 3.5310 | 4.4183 | 3.53130 |

(f)
Values and Equations (2) and (3) vs. focal length

| f | value of equation (2) | value of equation (3) |
|---|---|---|
| 38.7954 | 0.177 | 0.960 |
| 48.6686 | 0.197 | 0.838 |
| 59.3524 | 0.216 | 0.742 |
| 70.7749 | 0.230 | 0.663 |
| 82.7728 | 0.244 | 0.600 |
| 95.3305 | 0.256 | 0.548 |
| 108.4319 | 0.267 | 0.504 |
| 122.0381 | 0.277 | 0.467 |

In Table 1, part (c), the focusing displacement Δ is positive in the direction of light ray movement.

Referring to Table 1, part (e), for each focal length f, the focusing displacement Δ is linear with respect to the reciprocal 1/R of the object distance R. Thus, it is possible to determine the coefficient "a" in equation (10) to an adequate approximation with respect to each focal length f.

In the first embodiment, the relative displacement δz from the position of the third lens group G3 when the zoom line 100 is in the wide-angle end, for zooming of the third lens group G3 with respect to the fourth lens group G4, can be expressed by equation (11):

$$\delta z = 0.04882 \cdot \delta 1 \qquad (11)$$

Equation (11) uses the position of the third lens group G3 when in the wide-angle end as a base. δ1 is the displacement from the wide-angle end of the first lens group G1 for zooming the magnification of the first lens group G1.

In the preferred embodiment of the zoom lens 100, a zoom track can be selected to satisfy equation (11).

Furthermore, the focusing displacement δf of the third lens group G3 at close range can be expressed by equation (12):

$$\delta f = (-1.4580 - 0.4136 \times \delta 1)/R \qquad (12)$$

Here, the sign on the focusing displacement δf is determined so that the direction from the imaging plane toward the object is positive.

It is possible to find the focusing displacement δf, based on the object distance R and the displacement δ1, by varying the magnification of the first lens group G1. That is, it is possible to find the required focusing displacement δf from the displacement δ1 without having to find and store in a memory a coefficient "a" for each focal length.

Drawings of the aberrations in the first preferred embodiment of the zoom lens 100 are shown in FIGS. 5A–5D through 10A–10D. FIGS. 5A, 6A, 7a, 8a, 9A and 10A show the spherical aberrations, FIGS. 5B, 6B, 7B, 8B, 9B and 10B show the astigmatism, FIGS. 5C, 6C, 7C, 8C, 9C and 10C show the distortion aberrations and FIGS. 5D, 6D, 7D, 8D, 9D and 10D show the horizontal aberrations. FIGS. 5A–5D show aberrations in the infinite distance focus length when the zoom lens is in the wide-angle end, i.e., the shortest focal length. FIGS. 6A–6D show aberrations at an infinite distance focus length when the zoom lens is intermediate magnification state. FIGS. 7A–7D show aberrations in the infinite focus length when the zoom lens is the telephoto end, the longest magnification length.

FIGS. 8A–8D represent aberrations when the zoom lens has a photography magnification of $-\frac{1}{30}$ at the wide-angle end. FIGS. 9A–9D show aberrations when the zoom lens has a with photography magnification of $-\frac{1}{30}$ at an intermediate focal magnification. FIGS. 10A–10D show aberrations when the zoom lens has a photography magnification of $-\frac{1}{30}$ at the telephoto end.

In each of FIGS. 5A–10D, FN is the F number, H is the height of the incident light, Y is the image height and Δ is the angle of incidence of a primary light ray. In addition, in FIGS. 5B, 6B, 7B, 8B, 9B and 10B, the solid line indicates the sagittal image plane S and the dashed line indicates the meridional image plane M.

As FIGS. 5A–10D clearly show, the first preferred embodiment of the zoom lens 100 suitably corrects aberrations in at focal lengths, from an infinite focal length to a close range focal length.

Figure 11:
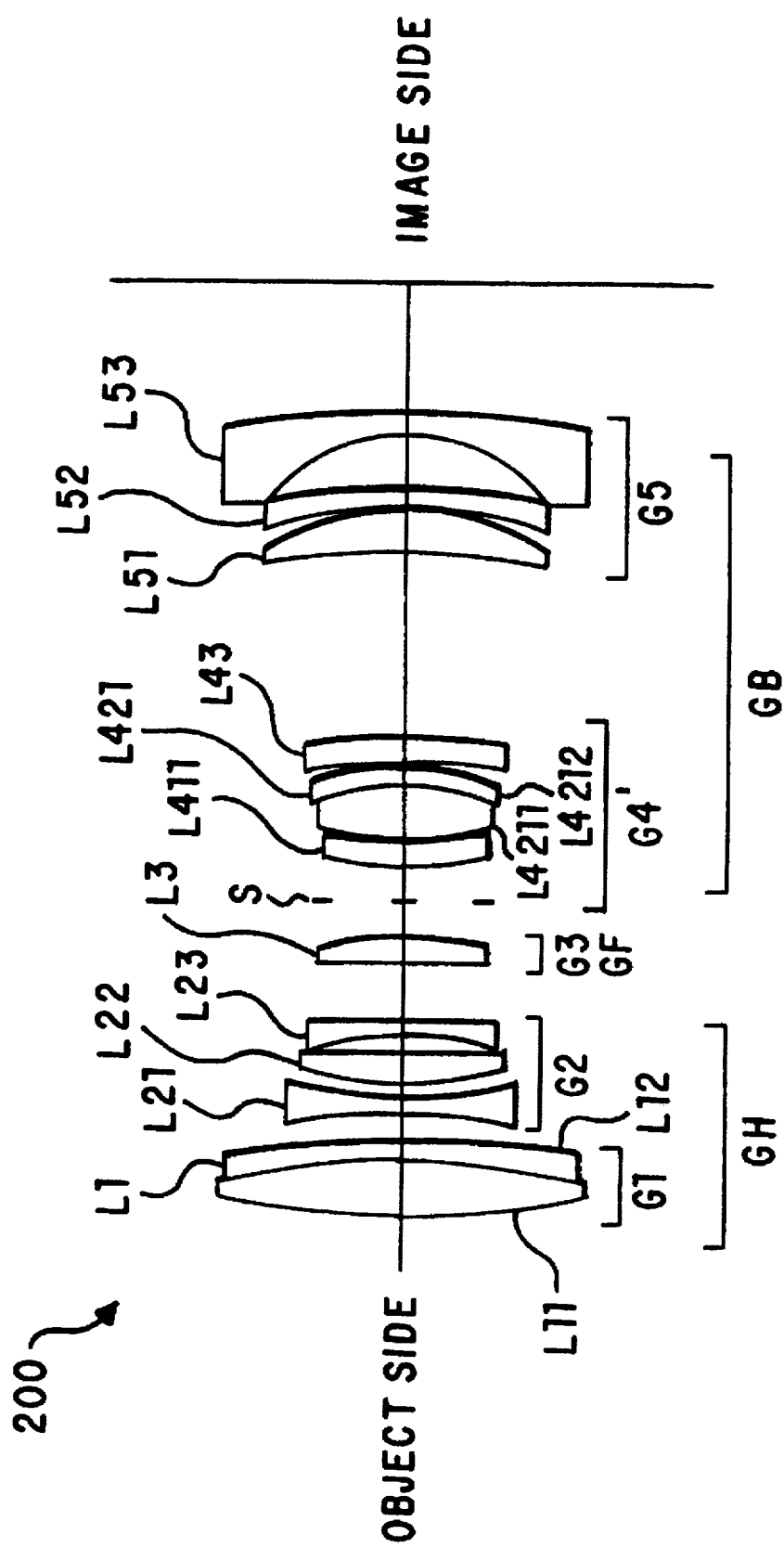
FIG. 11 shows a second preferred embodiment of a zoom lens of the present invention.
Figures 14A, 14B, 14C, 14D:
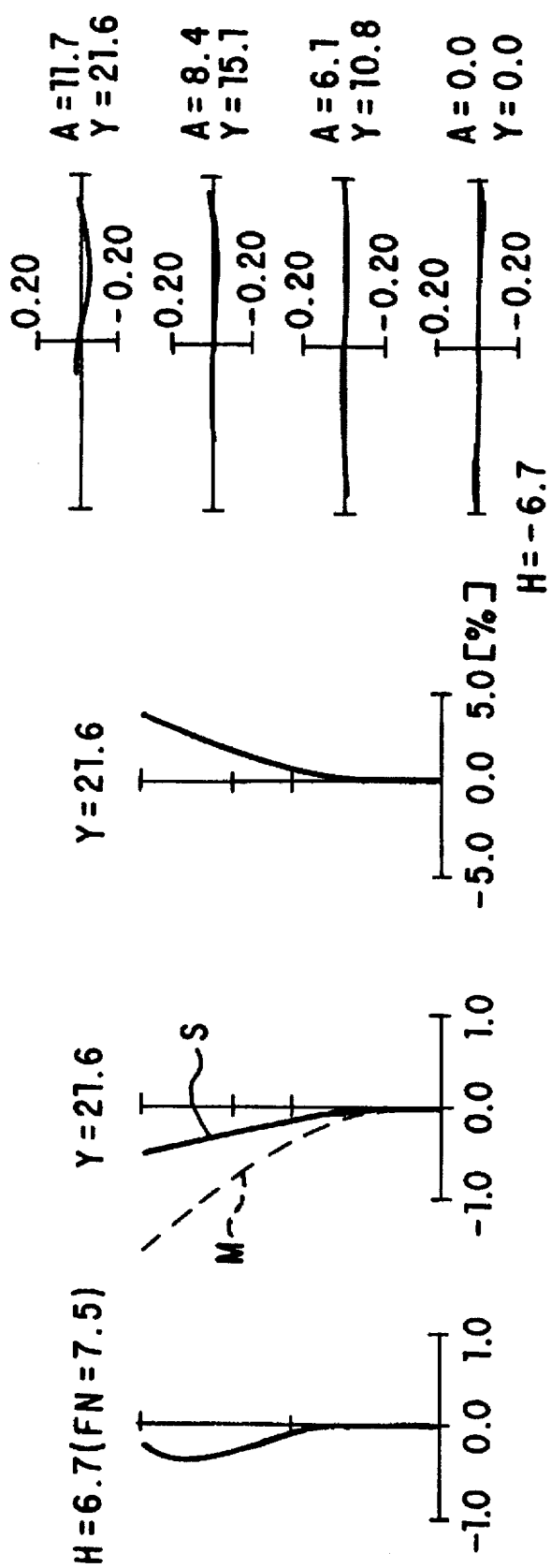
FIGS. 14A–14D represent the aberrations when the second preferred embodiment of the zoom lens is in the infinite focal length at a second intermediate magnification state.
Figures 17A, 17B, 17C, 17D:
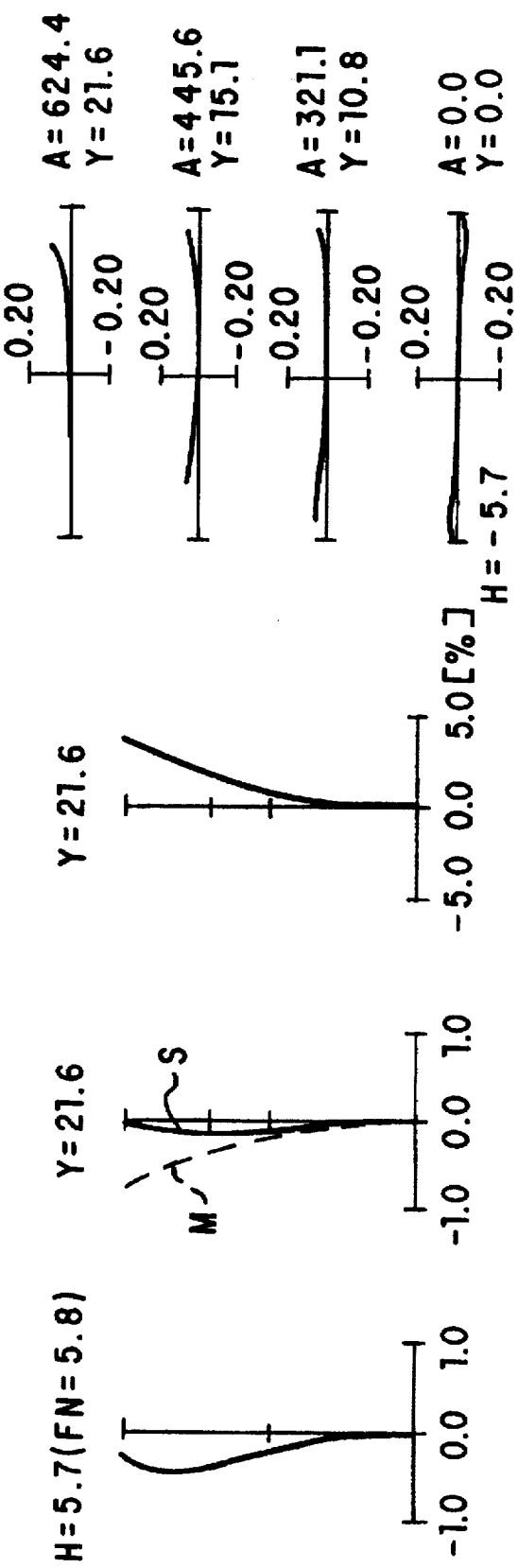
FIGS. 17A–17D represent the aberrations when the second preferred embodiment of the zoom lens has a photography magnification of −1/30 when in a first intermediate focal magnification state.

FIG. 11 shows the configuration of a zoom lens 200 according to a second preferred embodiment. The zoom lens 200 includes, in order from the object side, a first lens group G1, which includes a cemented positive lens L1, having a biconvex lens L11 and a negative meniscus lens L12 having its concave surface facing to the object side; a second lens group G2, which includes a biconcave lens L21, a biconvex lens L22 and a negative meniscus lens L23; a third lens group G3 including a biconvex lens L3 having its concave surface facing to the object side; a fourth lens group G4' including a positive meniscus lens L411 having its concave surface facing to the object side, a cemented positive lens L421 with a biconvex lens L4211 and a negative meniscus lens L4212 having its concave surface facing to the object side, and a negative meniscus lens L43 having its concave surface facing to the object side; and a fifth lens group G5 including a positive meniscus lens L51 having the concave surface facing to the object side, a negative meniscus lens L52 having its concave surface facing the object side, and a negative meniscus lens L53 having the concave surface facing to the object side. The third lens group G3 moves toward the image side when focusing on an object at close range.

The first and second lens groups G1 and G2 form the first variable power lens group GH. The third lens group G3 forms the focusing lens group GF. The fourth and fifth lens groups G4' and G5 form the second variable power lens group GB. In addition, a stop S is arranged between the third lens group G3 and the fourth lens group G4. The stop S moves with the fourth lens group G4 for zooming from wide-angle end to telephoto end.

FIG. 11 shows the relative positions between the lens groups G1–G5, when the zoom lens is at a wide-angle end. The lens groups move along the optical axis on a zoom trace as indicated by the arrows in FIG. 3, for zooming from wide-angle end to telephoto end.

The values for the second preferred embodiment of the zoom lens 200 are given in Table (2) below. In Table (2), f is the focal length, $FN_0$ is the F number, 2ω is the field angle and Bf is the back focus. The surface number indicates the order of the lens surfaces from the object side to the image side along the direction in which light rays move, the refractive indices and Abbe's numbers indicate the values for d-line (λ=587.6 nm).

f=38.80~69.07~100.47~146.93 mm $FN_o$=4.1~5.8~7.5~9.7

2ω=58.24~33.35~23.34~16.30°

TABLE 2

(a)

| Surface Number | Radius of Curvature | Intersurface Distance | Refractive Index | Abbe's Number |
|---|---|---|---|---|
| 1 | 63.1212 | 4.27 | 1.51860 | 69.98 |
| 2 | –46.8523 | 1.26 | 1.86074 | 23.01 |
| 3 | –76.4097 | variable | | |
| 4 | –37.029 | 1.13 | 1.79668 | 45.37 |
| 5 | 24.7002 | 0.88 | | |
| 6 | 19.330 | 2.89 | 1.72825 | 25.80 |
| 7 | –122.816 | 0.93 | | |
| 8 | –22.3702 | 1.13 | 1.79668 | 45.37 |
| 9 | 5400.0365 | variable | | |
| 10 | –1110.1994 | 1.88 | 1.51860 | 69.98 |
| 11 | –21.4093 | variable | | |
| 12 | ∞ | 2.51 | stop S | |
| 13 | 35.9674 | 1.88 | 1.51823 | 58.90 |
| 14 | 125.5814 | 0.13 | | |
| 15 | 29.3767 | 3.77 | 1.51860 | 69.98 |
| 16 | –13.8166 | 1.26 | 1.80518 | 25.35 |
| 17 | –24.3599 | 0.38 | | |
| 18 | –34.7066 | 1.88 | 1.80518 | 25.35 |
| 19 | –51.3329 | variable | | |
| 20 | –55.9076 | 3.27 | 1.80518 | 25.35 |
| 21 | –17.5684 | 0.17 | | |
| 22 | –26.1538 | 1.26 | 1.84042 | 43.35 |
| 23 | –83.4784 | 4.23 | | |
| 24 | –12.3760 | 1.51 | 1.77279 | 49.45 |
| 25 | –81.5024 | (Bf) | | |

(b) Distance vs. Focal Length for Variable Spacing

| f | 38.8046 | 69.0699 | 100.4655 | 146.9311 |
|---|---|---|---|---|
| d3 | 2.1349 | 14.5062 | 19.9790 | 24.5778 |
| d9 | 4.3337 | 3.2564 | 2.3833 | 1.2553 |
| d11 | 2.5733 | 3.5606 | 4.5237 | 5.6517 |
| d19 | 13.6224 | 7.0617 | 3.7370 | 1.0735 |
| Bf | 9.4187 | 25.4782 | 41.0549 | 62.0188 |

(c) Δ Photography Magnification of $-\frac{1}{30}$

| Focal length f | 38.8046 | 69.0699 | 100.4655 | 146.9311 |
|---|---|---|---|---|
| Object Distance R | 1186.4713 | 2075.6760 | 3007.265 | 4391.9308 |
| Displacement Δ | 1.2380 | 1.1047 | 0.9683 | 0.9683 |

In Table 2(c), the focusing displacement Δ is positive in the direction of progression of light rays.

(d) Distances vs. TL for Variable Spacing

| f | d3 | d9 | d11 | d15 | Bf | TL |
|---|---|---|---|---|---|---|
| 38.8046 | 2.1349 | 4.3337 | 2.5733 | 13.6225 | 9.4187 | 68.8004 |
| 53.3931 | 9.8875 | 3.7563 | 3.1507 | 9.8022 | 17.1840 | 80.4227 |
| 69.0699 | 14.5062 | 3.2564 | 3.6506 | 7.0617 | 25.4782 | 90.6705 |
| 84.7678 | 17.6332 | 2.8045 | 4.1025 | 5.1508 | 33.4370 | 19.8455 |
| 100.4655 | 19.9790 | 2.3833 | 4.5237 | 3.7370 | 41.0549 | 108.3954 |
| 116.1631 | 21.8330 | 1.9582 | 4.9218 | 2.6425 | 48.3782 | 116.4782 |
| 131.8612 | 23.3506 | 1.6054 | 5.3016 | 1.7665 | 55.4460 | 124.1874 |

TABLE 2-continued

| 146.9311 | 24.5778 | 1.2553 | 5.6517 | 1.0735 | 62.0188 | 131.2945 |
|---|---|---|---|---|---|---|

(e)
Δ vs. "a"

| f | 1/R = 0.25 | 1/R = 0.50 | 1/R = 0.75 | 1/R = 1.00 | 1/R = 1.25 | a |
|---|---|---|---|---|---|---|
| 38.804 | 0.3256 | 0.654 | 0.9875 | 1.324 | 1.6644 | 1.32479 |
| 53.393 | 0.4440 | 0.890 | 1.3400 | 1.7920 | 2.2467 | 1.79264 |
| 69.069 | 0.5488 | 1.099 | 1.6508 | 2.204 | 2.7588 | 2.20431 |
| 84.767 | 0.6428 | 1.285 | 1.9291 | 2.5728 | 3.216 | 2.57280 |
| 100.465 | 0.7304 | 1.459 | 2.1885 | 2.9163 | 3.6432 | 2.91613 |
| 116.163 | 0.8132 | 1.624 | 2.4338 | 3.241 | 4.0465 | 3.24074 |
| 131.8612 | 0.8921 | 1.7813 | 2.6676 | 3.5510 | 4.4314 | 3.55045 |
| 146.931 | 0.9648 | 1.9259 | 2.8832 | 3.8368 | 4.7866 | 3.83609 |

(f)
Values and Equations (2) and (3) vs. focal length

| f | value of equation (2) | value of equation (3) |
|---|---|---|
| 38.8046 | 0.012 | 0.927 |
| 53.3931 | 0.015 | 0.788 |
| 69.0699 | 0.034 | 0.677 |
| 84.7678 | 0.049 | 0.597 |
| 100.4655 | 0.061 | 0.537 |
| 116.1631 | 0.072 | 0.490 |
| 131.8612 | 0.080 | 0.452 |
| 146.9311 | 0.088 | 0.422 |

With reference to the Table 2, part (c), for each focal length f, the focusing displacement Δ, is linear with respect to the reciprocal 1/R of the object distance R. Thus, it is possible to determine the coefficient "a" in equation (10) to an adequate approximation with respect to each focal length f.

In the second embodiment, similar to the first embodiment, it is possible to find the focusing displacement δf, based on the object distance R and the displacement δ1 of the first lens group G1.

FIGS. 12A–19D are drawings, similar to FIGS. 5A–10D, representing aberrations according to the second embodiment. FIGS. 12A–12D show aberrations at an infinite distance focus length when the zoom lens is at the wide-angle end or the shortest focal length state. FIGS. 13A–13D show aberrations at an infinite distance focus length when the zoom lens is at a first intermediate magnification state (f=69.0699). FIGS. 14A–14D show aberrations at an infinite distance focus length when the zoom lens is at a second intermediate magnification state (f=100.4655). FIGS. 15A–15D show aberrations at an infinite distance focus length when the zoom lens is at the telephoto end, the longest focal length state.

FIGS. 16A–16D show aberrations when the zoom lens has a photography magnification of −1/30 at the wide-angle end. FIGS. 17A–17D show aberrations when the zoom lens has a photography magnification of −1/30 at a first intermediate focal magnification state (f=69.0699). FIGS. 18A–18D show aberrations when the zoom lens has a photography magnification of −1/30 at a second intermediate focal magnification state (f=100.4655). FIGS. 19A–19D show aberrations when the zoom lens has a photography magnification of −1/30 at the telephoto end. In each of the drawings representing aberrations, FN is the F number, H is the height of the incident light, Y is the image height and A is the angle of incidence of a primary light ray. In addition, in FIGS. 12B, 13B, 14B, 15B, 16B, 17B and 18B, the solid line indicates the sagittal image plane S and the dashed line indicates the meridional image plane M.

As FIGS. 12A–19D clearly shows, the second preferred embodiment of the zoom lens 200, the aberrations are suitably corrected at focal lengths, from an infinite focal length state to a close range focal length.

Further, in either the zoom lens 100 or 200, it is possible to correct for shaking of the image plane by moving parts of the lens groups forming the lens system in a direction substantially perpendicular to the optical axis. Furthermore, the lens groups G2 and G4 of the focusing lens group GF are not limited to moving together for zooming. Rather, in the above embodiments, the movement of the lens groups G2 and G4 was linked merely to simplify the structure of the lens barrel. The lens groups G2 and G4 do not have to move integrally or together and can be provided so they move independently.

Figure 20:
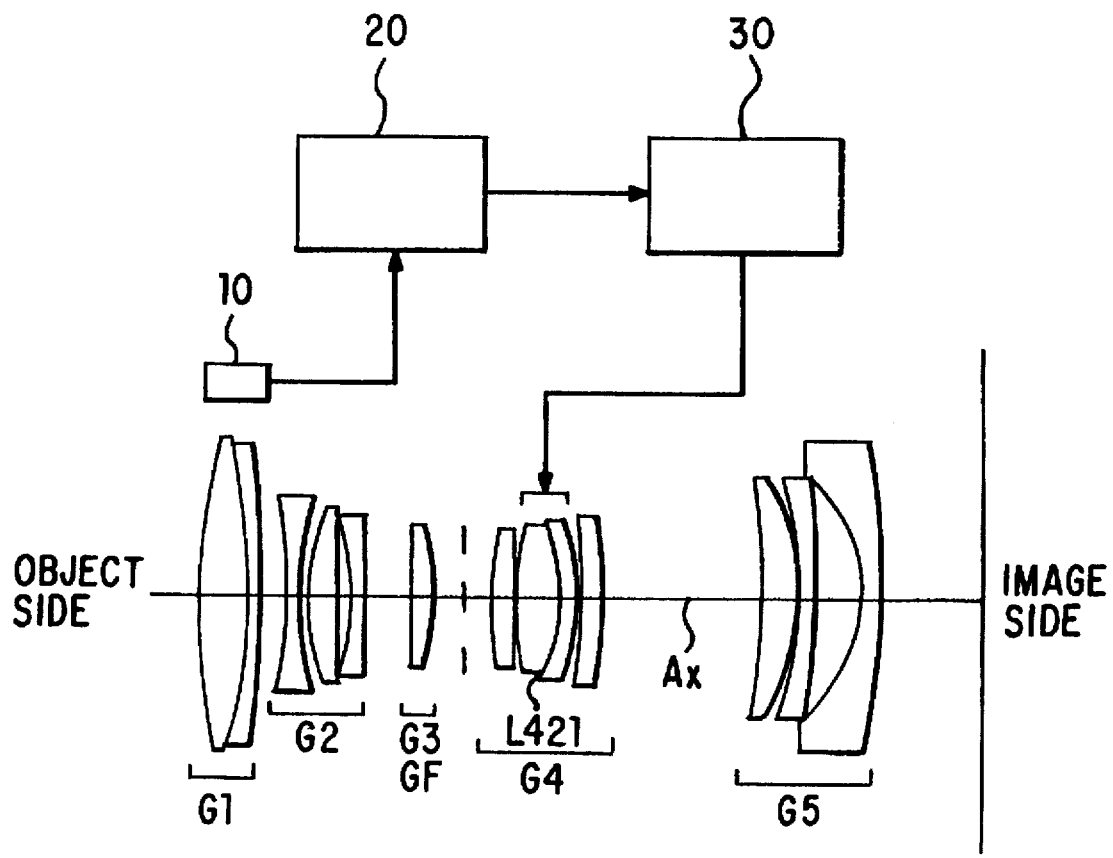
FIG. 20 shows a second preferred embodiment of the zoom lens according to the present invention.

For example, in a second preferred embodiment, as shown in FIG. 20, the lenses include the fourth lens group G4'. In the second preferred embodiment elements similar to those in the first preferred embodiment have the same or similar reference characters. The second preferred embodiment will be described discussing the differing elements, in order to simplify the description.

The fourth lens group G4' includes a joined positive lens 421 that can be driven in a direction substantially generally perpendicular to the optical axis Ax. Thus, it is possible for the image to shift while suppressing the deterioration of optical performance.

In FIG. 20, an angular velocity sensor 10 detects any play in the optical system that is caused by a manual play. The sensor transmits an output indicative of one play to a controller 20. The controller 20 then transmits a signal to activator 30 to correct the image which may be offline due to the play. The actuator 30 moves the joined positive lens 421 of the fourth lens group G4 in a direction substantially generally perpendicular with the optical axis Ax. Therefore, when play occurs in the zoom lens, the control unit 20 calculates an amount of drive needed to compensate for the play and drives the actuator 30. Thus, the zoom lens can correct movements in the image that originates from a play in the zoom lens. Further, the zoom lens of FIG. 20 has the numerical values shown in the Table 2.

With either the zoom lens 100 or 200, which are capable of focusing at close range, it is possible to easily control the focusing lens group GF and to provide a small memory capacity. This increases the available zooming range.

While this invention has been described in conjunction with the above described embodiments, it is evident that many alternative, modifications and variations will be apparent to those skilled in the art. Accordingly, the preferred embodiments of the invention as set forth above are intended to be illustrative, rather than limiting. Various changes may be made without departing from the spirit and scope of this invention as defined in the following claims.

What is claimed is:

1. A zoom lens capable of focusing at a close range, the zoom lens having an optical axis and a zooming range from a wide-angle end to a telephoto end; comprising:

a first variable power unit that has at least two lens groups and at least one of the at least two lens groups being movable;

a focusing lens group movable along the optical axis to focus on an object at the close range, wherein βF represents a magnification of the focusing lens group focused on an infinite object;

wherein the focusing lens group moves a first amount to focus on a close range object at the wide-angle end and moves a second amount that is less than the first amount to focus on a close range object at the telephoto end and the zoom lens is configured such that 1/|βF|<0.35 over the entire zooming range of the zoom lens.

2. The zoom lens according to claim 1, wherein a distance between first variable power unit and the focusing lens group is variable for zooming.

3. The zoom lens according to claim 2, wherein the first variable power unit comprises a positive sub-unit and a negative sub-unit, the negative sub-unit being positioned on the image side of the positive sub-unit, wherein a distance between the positive and negative sub-units is increased for zooming from wide angle end to the telephoto end.

4. The zoom lens according to claim 1, further including a stop arranged adjacent to the focusing lens group.

5. The zoom lens according to claim 1, wherein the first variable power unit comprises a positive sub-unit and a negative sub-unit, the negative sub-unit being positioned on the image side of the positive sub-unit, wherein a distance between the positive and negative sub-units is increased for zooming from wide angle end to the telephoto end.

6. The zoom lens according to claim 5, wherein the positive sub-unit includes a positive cemented lens having a biconvex lens and a negative meniscus lens, the negative meniscus lens having a concave surface facing to the object side.

7. The zoom lens according to claim 5, wherein the negative sub-unit includes a biconcave lens.

8. The zoom lens according to claim 1, wherein the focusing lens group includes a positive lens.

9. The zoom lens according to claim 1, further including a second variable power unit.

10. A zoom lens according to claim 9, further including a stop positioned between focusing lens group and the second variable power unit.

11. The zoom lens according to claim 9, wherein the first variable power unit is on an object side of the focusing lens group, and the second variable power unit is on an image side of the focusing lens group.

12. The zoom lens according to claim 9, wherein the second variable power unit includes a positive lens group and a negative lens group.

13. A zoom lens according to claim 12, wherein the focusing lens group and the positive lens group of the second variable power unit move independently during zooming.

14. A zoom lens according to claim 12, wherein the positive lens group of the second variable power unit comprises a cemented lens comprising a biconvex lens and a negative meniscus lens having a concave surface facing to the object side.

15. The zoom lens according to claim 12, wherein the negative lens group of the second variable power unit includes a positive meniscus lens having a concave surface facing to the object side, a negative meniscus lens having a concave surface facing to the object side, and a positive meniscus lens having a concave surface facing to the object side.

16. The zoom lens according to claim 12, wherein the positive lens group of the second variable power unit includes a positive meniscus lens having a concave surface facing to the object side, a cemented positive lens comprising a biconvex lens and a negative meniscus lens having a concave surface facing to the object side, and a negative meniscus lens having a concave surface facing to the object side.

17. The zoom lens according to claim 12, wherein the negative lens group of the second variable power unit includes a positive meniscus lens having a concave surface facing to the object side, a negative meniscus lens having a concave surface facing to the object side, and a positive meniscus lens having a concave surface facing to the object side.

18. The zoom lens according to claim 1, further including a shift lens group arranged in the zoom lens in a direction perpendicular to the optical axis, wherein the image can be shifted by moving the shift lens group, while suppressing the variation of the aberrations.

19. The zoom lens according to claim 18, wherein the shift lens group is positioned on the image side of the focusing lens group.

20. The zoom lens according to claim 1, wherein the zoom lens is configured such that |fh|/f<1.2 over an entire zooming range of the zoom lens.

21. The zoom lens according to claim 1, wherein the at least one movable lens group comprises a positive sub-unit, which is movable along the optical axis for zooming.

22. A zoom lens capable of focusing at a close range, the zoom lens having an optical axis, and comprising:

a focusing lens group movable along the optical axis to focus on an object at the close range; and a shifting lens group arranged in the zoom lens in a direction perpendicular to the optical axis, wherein the image can be shifted by moving the shifting lens group while suppressing the variation of the aberrations, βF represents a magnification of the focusing lens group focused on an infinite object, and the zoom lens is configured such that 1/|βF|<0.35 over an entire zooming range of the zoom lens.

23. The zoom lens according to claim 22, wherein the shifting lens group is positioned on an image side of the focusing lens group.

24. The zoom lens according to claim 22, further comprising a first variable power unit comprising two lens groups, and at least one of the lens groups being movable.

25. A zoom lens capable of focusing at a close range, the zoom lens having an optical axis and comprising:

a first variable power unit that has at least two lens groups and at least one of the at least two lens groups being movable; and a focusing lens group movable along the optical axis to focus on an object at the close range, wherein movement of the focusing lens group to focus on an object at an object distance R is inversely proportional to R.

* * * * *